United States Patent
Wu et al.

(10) Patent No.: US 11,425,726 B2
(45) Date of Patent: Aug. 23, 2022

(54) PREDICTIVE SCHEDULING FOR MM-WAVE BASED CV2X

(71) Applicant: QUALCOMM Incorporated, San Diego, CA (US)

(72) Inventors: Zhibin Wu, Los Altos, CA (US); Navid Abedini, Basking Ridge, NJ (US); Kapil Gulati, Belle Mead, NJ (US); Sudhir Kumar Baghel, Hillsborough, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/186,876

(22) Filed: Feb. 26, 2021

(65) Prior Publication Data

US 2021/0185663 A1     Jun. 17, 2021

Related U.S. Application Data

(63) Continuation of application No. 16/426,748, filed on May 30, 2019, now Pat. No. 10,939,448.

(Continued)

(51) Int. Cl.
*H04W 72/04*     (2009.01)
*H04W 40/22*     (2009.01)
(Continued)

(52) U.S. Cl.
CPC .......... *H04W 72/048* (2013.01); *H04W 4/40* (2018.02); *H04W 40/22* (2013.01); *H04W 64/006* (2013.01); *H04W 84/18* (2013.01)

(58) Field of Classification Search
None
See application file for complete search history.

(56) References Cited

U.S. PATENT DOCUMENTS 10,863,394 B2 * 12/2020 Kim ..................... H04W 76/27
10,939,448 B2    3/2021 Wu et al.
(Continued)

FOREIGN PATENT DOCUMENTS

| EP | 2600654 A1 | 6/2013 |
| EP | 2955967 A1 | 12/2015 |
| WO | 2017080782 A1 | 5/2017 |

OTHER PUBLICATIONS

International Search Report and Written Opinion—PCT/US2019/035007—ISA/EPO—dated Aug. 30, 2019.

*Primary Examiner* — Otis L Thompson, Jr.
(74) *Attorney, Agent, or Firm* — Arent Fox LLP

(57) ABSTRACT

Methods, apparatuses, and computer-readable mediums for wireless communication are disclosed by the present disclosure. In an example, a first wireless communication device may transmit, to a relay node, a first predicted motion of a first vehicle including the first wireless communication device having a first established communication channel with the relay node. The first wireless communication device may receive an indication that the first predicted motion will trigger a communication condition for the first vehicle and a second wireless communication device having a second established communication channel with the relay node, the indication including reserved resources for a third communication channel between the first wireless communication device and the second wireless communication device. The first wireless communication device may communicate with the second wireless communication device using the reserved resources for a third communication channel without performing a random access procedure with the second wireless communication device.

30 Claims, 11 Drawing Sheets

Related U.S. Application Data

(60) Provisional application No. 62/682,499, filed on Jun. 8, 2018.

(51) Int. Cl.
*H04W 4/40* (2018.01)
*H04W 64/00* (2009.01)
*H04W 84/18* (2009.01)

(56) References Cited

U.S. PATENT DOCUMENTS

| | | | |
|---|---|---|---|
| 11,006,331 B2 * | 5/2021 | Wu | H04W 76/18 |
| 11,153,865 B2 * | 10/2021 | Park | H04W 24/02 |
| 11,160,119 B2 * | 10/2021 | Lee | H04W 72/02 |
| 2007/0054674 A1 | 3/2007 | Cohen et al. | |
| 2017/0289864 A1 | 10/2017 | Narasimha et al. | |
| 2017/0323562 A1 | 11/2017 | Rech et al. | |
| 2019/0281644 A1 | 9/2019 | Hu et al. | |
| 2019/0322367 A1 | 10/2019 | El Idrissi | |
| 2020/0041292 A1 | 2/2020 | Sugiyama et al. | |
| 2020/0064488 A1 | 2/2020 | Shan | |
| 2020/0168086 A1 | 5/2020 | Rakshit et al. | |
| 2020/0175851 A1 | 6/2020 | Serban et al. | |

* cited by examiner

PREDICTIVE SCHEDULING FOR MM-WAVE BASED CV2X

CROSS REFERENCE TO RELATED APPLICATIONS

This application is a continuation of U.S. patent application Ser. No. 16/426,748 titled "PREDICTIVE SCHEDULING FOR MM-WAVE BASED CV2X," filed May 30, 2019, which claims priority to U.S. Provisional Application No. 62/682,499 titled "PREDICTIVE SCHEDULING FOR MM-WAVE BASED CV2X," filed Jun. 8, 2018, both of which are assigned to the assignee hereof, and incorporated herein by reference in their entirety.

BACKGROUND

Technical Field

The present disclosure relates generally to communication systems, and more particularly, techniques for cellular vehicle-to-everything (CV2X) in 5G New Radio (NR).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, CV2X communications may include devices discovering and communicating with other nearby devices. Beamforming techniques used with various frequency bands in NR may complicate existing discovery techniques. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and computer-readable mediums for wireless communication are disclosed by the present disclosure. In an aspect, the present disclosure includes a method of wireless communications. The method may include determining, at a relay node, a first predicted motion of a first vehicle including a first wireless communication device having a first established communication channel with the relay node. The method may include determining that the first predicted motion will trigger a communication condition for the first vehicle and a second wireless communication device having a second established communication channel with the relay node. The method may include reserving radio resources for a third communication channel between the first wireless communication device and the second wireless communication device. The method may include transmitting an indication of the reserved resources to the first wireless communication device via the first communication channel and to the second wireless communication device via the second communication channel.

In another aspect, the disclosure provides another method of wireless communications for a first wireless communication device. The method may include transmitting, to a relay node, a first predicted motion of a first vehicle including the first wireless communication device having a first established communication channel with the relay node. The method may include receiving an indication that the first predicted motion will trigger a communication condition for the first vehicle and a second wireless communication device having a second established communication channel with the relay node, the indication including reserved resources for a third communication channel between the first wireless communication device and the second wireless communication device. The method may include communicating between the first wireless communication device and the second wireless communication device using the reserved resources for a third communication channel without performing a random access procedure between the first wireless communication device and the second wireless communication device.

In another aspect, the disclosure provides a relay node for wireless communication. The relay node may include a memory and a processor in communication with the memory. The processor may be configured to determine a first predicted motion of a first vehicle including a first wireless communication device having a first established communication channel with the relay node. The processor may be configured to determine that the first predicted motion will trigger a communication condition for the first vehicle and a second wireless communication device having a second established communication channel with the relay node. The processor may be configured to reserve radio resources for a third communication channel between the first wireless communication device and the second wireless communication device. The processor may be configured to transmit an indication of the reserved resources to the first wireless communication device via the first communication channel and to the second wireless communication device via the second communication channel.

In another aspect, the disclosure provides a first wireless communication device for wireless communications. The first wireless communication device may include a memory and a processor in communication with the memory. The processor may be configured to transmit, to a relay node, a first predicted motion of a first vehicle including the first wireless communication device having a first established communication channel with the relay node. The processor may be configured to receive an indication that the first predicted motion will trigger a communication condition for the first vehicle and a second wireless communication device having a second established communication channel with the relay node, the indication including reserved resources for a third communication channel between the first wireless communication device and the second wireless communication device. The processor may be configured to communicate between the first wireless communication device and the second wireless communication device using the reserved resources for a third communication channel without performing a random access procedure between the first wireless communication device and the second wireless communication device.

In another aspect, the disclosure provides a relay node for wireless communication. The relay node may include means for determining, at a relay node, a first predicted motion of a first vehicle including a first wireless communication device having a first established communication channel with the relay node. The relay node may include means for determining that the first predicted motion will trigger a communication condition for the first vehicle and a second wireless communication device having a second established communication channel with the relay node. The relay node may include means for reserving radio resources for a third communication channel between the first wireless communication device and the second wireless communication device. The relay node may include means for transmitting an indication of the reserved resources to the first wireless communication device via the first communication channel and to the second wireless communication device via the second communication channel.

In another aspect, the disclosure provides a first wireless communication device for wireless communications. The first wireless communication device may include means for transmitting, to a relay node, a first predicted motion of a first vehicle including the first wireless communication device having a first established communication channel with the relay node. The first wireless communication device may include means for receiving an indication that the first predicted motion will trigger a communication condition for the first vehicle and a second wireless communication device having a second established communication channel with the relay node, the indication including reserved resources for a third communication channel between the first wireless communication device and the second wireless communication device. The first wireless communication device may include means for communicating between the first wireless communication device and the second wireless communication device using the reserved resources for a third communication channel without performing a random access procedure between the first wireless communication device and the second wireless communication device.

In another aspect, the disclosure provides a non-transitory computer-readable medium storing computer code executable by a processor for wireless communications. The non-transitory computer-readable medium may include code to determine a first predicted motion of a first vehicle including a first wireless communication device having a first established communication channel with the relay node. The non-transitory computer-readable medium may include code to determine that the first predicted motion will trigger a communication condition for the first vehicle and a second wireless communication device having a second established communication channel with the relay node. The non-transitory computer-readable medium may include code to reserve radio resources for a third communication channel between the first wireless communication device and the second wireless communication device. The non-transitory computer-readable medium may include code to transmit an indication of the reserved resources to the first wireless communication device via the first communication channel and to the second wireless communication device via the second communication channel.

In another aspect, the disclosure provides a non-transitory computer-readable medium storing computer code executable by a processor for wireless communications. The non-transitory computer-readable medium may include code to transmit, to a relay node, a first predicted motion of a first vehicle including a first wireless communication device having a first established communication channel with the relay node. The non-transitory computer-readable medium may include code to receive an indication that the first predicted motion will trigger a communication condition for the first vehicle and a second wireless communication device having a second established communication channel with the relay node, the indication including reserved resources for a third communication channel between the first wireless communication device and the second wireless communication device. The non-transitory computer-readable medium may include code to communicate between the first wireless communication device and the second wireless communication device using the reserved resources for a third communication channel without performing a random access procedure between the first wireless communication device and the second wireless communication device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
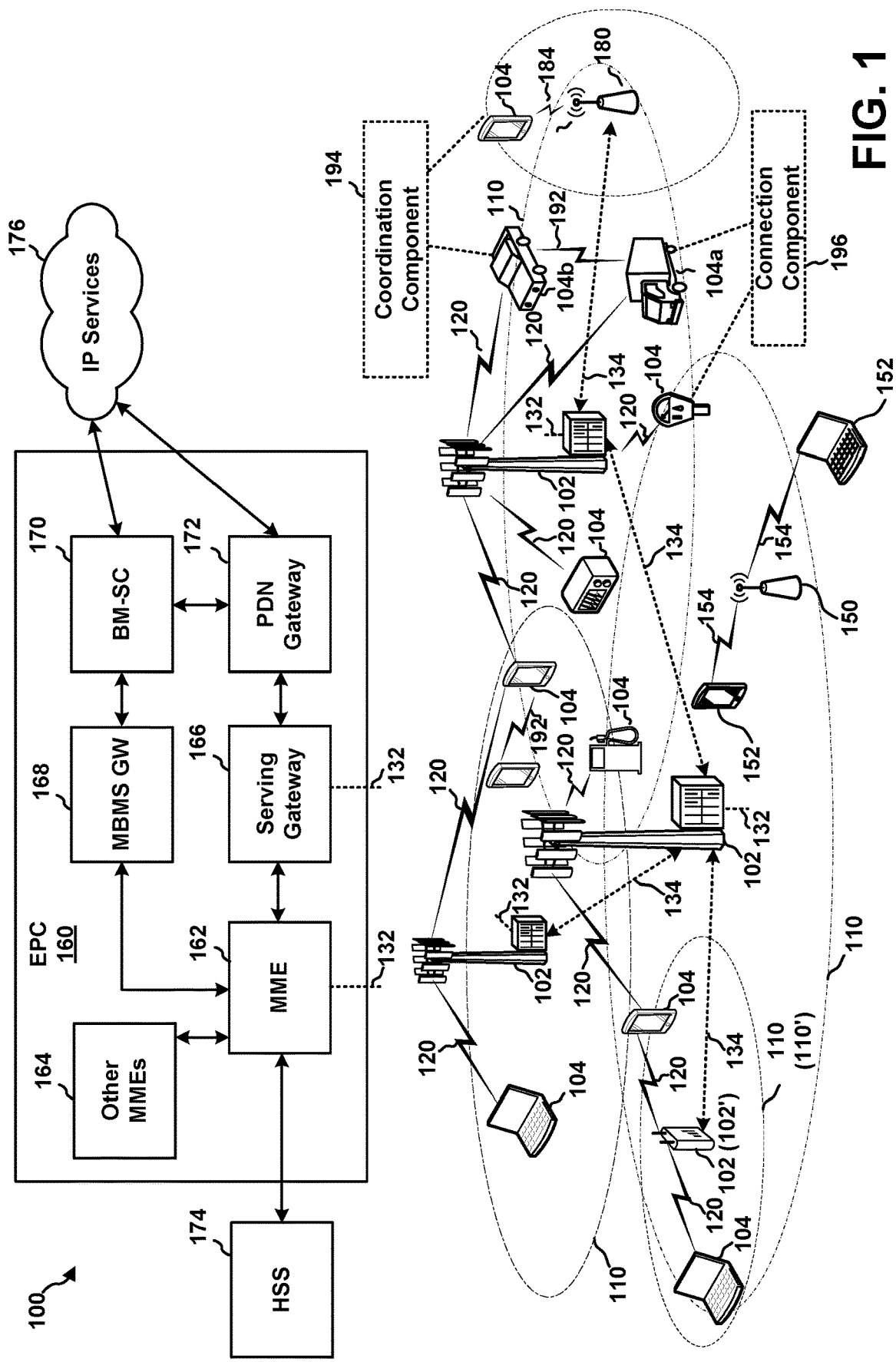
FIG. 1 is a block diagram illustrating an example of a wireless communications system and an access network.

Methods, apparatuses, and computer-readable mediums for wireless communication are disclosed by the present disclosure. In an example, a relay node in communication with a first vehicle and a second vehicle may coordinate communication resources between the first vehicle and the second vehicle. Accordingly, the first vehicle and the second vehicle may communicate directly with each other without performing a discovery and/or random access procedure.

In a CV2X scenario, vehicles or user equipment (UE) within vehicles may benefit from direct communications with other vehicles or UEs, including UEs located at fixed locations (e.g., transportation infrastructure such as traffic control devices). In proposed 5G NR systems utilizing millimeter-wave communications, beamforming may be used to direct radio signals in specific directions. The combination of moving vehicles and beamforming presents a challenge for initiating communication between devices. 5G discovery procedures may involve periodically beam-sweeping a discovery signal (preamble or message) using different beams until another UE responds. When a response to the discovery signal is received, a host UE and a client UE may perform a RACH procedure to establish a communication channel and schedule communications. The combination of the discovery procedure and the RACH procedure may be time consuming, especially if a vehicle with the UE is moving such that positions and relative directions among the vehicles change. Additionally, if a vehicle or UE is already in communication with one or more other vehicles or UEs, transmitting or monitoring discovery signals and RACH messages may interrupt or cause scheduling difficulties for the existing communication channels.

The present disclosure provides techniques for establishing a communication channel between two or more UEs using a relay node that has previously established communication channels with at least two of the UEs. The relay node may receive position and/or motion information regarding at least one of the UEs and predict that two of the UEs are likely to satisfy a communication condition in which communication between the two UEs may be desired. The relay node may then facilitate establishment of a communication channel by reserving resources for the communication. The relay node may transmit an indication of the reserved resources to each of the UEs. The relay node may also forward the position or motion information to the UEs such that the UEs may determine beamforming parameters for the communication. Using the relay node to establish a communication channel may allow the two UEs to skip a discovery and/or RACH procedure and more quickly establish the communication channel. For example, where the communication condition is a line of sight, the relay node may establish the communication channel and reserve the resources.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. Although an EPC 160 is illustrated, the wireless communications system may include a different core network such as a 5G Core (5GC). References herein to the EPC 160 may also refer to a 5GC. The base stations 102 may include macro cells (high power cellular base station) and/or small cell base stations (low power cellular base station). The UEs 104 may include one or more host UEs 104a that advertise services on the preconfigured discovery resources and one or more client UEs 104b that respond. For example, a host UE 104a may be a vehicle or integrated into the vehicle and provide an autonomous driving information service that provides information about the vehicle's planned movements for coordination with other vehicles. As another example, a UE 104a may be a separate device located within the vehicle performing a navigation function that involves monitoring vehicle movement.

The base stations 102 (collectively referred to as Evolved Universal Mobile Telecommunications System (UMTS) Terrestrial Radio Access Network (E-UTRAN)) interface with the EPC 160 and/or 5GC through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 and/or 5GC) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell base station 102' may have a coverage area 110' that overlaps the coverage area 110 of one or more macro cell base stations 102. A network that includes both small cell base stations and macro cell base stations may be known as a heterogeneous network. A heterogeneous network may also include Home Evolved Node Base Stations (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using one or more device-to-device (D2D) communication links 192. A D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ NR and use the same 5 GHz unlicensed frequency spectrum as used by the Wi-Fi AP 150. The small cell base station 102', employing NR in an unlicensed frequency spectrum, may boost coverage to and/or increase capacity of the access network.

A gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. In an aspect, a gNB 180 operating using mmW may utilize beamforming 184 with the UE 104 to compensate for the extremely high path loss and short range. Additionally, UEs 104 performing D2D communications may operate using mmW and may also utilize beamforming 184.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions.

The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), relay node, or some other suitable terminology. The base station 102 provides an access point to the EPC 160 and/or 5GC for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In mmW communication systems (e.g., access network 100), a line of sight (LOS) may be needed between a transmitting device (e.g., base station 102) and a receiving device (e.g., UE 104), or between two UEs 104. Frequency is very high (e.g., greater than 28 GHz) in mmW communication systems which means that beam widths are very small, as the beam widths are inversely proportional to the frequency of the waves or carriers transmitted by an antenna of the transmitting device. Beam widths used in mmW communications are often termed as "pencil beams." The small wavelengths may result in many objects or materials acting as obstacles including even oxygen molecules. Therefore, LOS between the transmitter and receiver may be required unless a reflected path is strong enough to transmit data. Further, in some examples, base stations may track UEs 104 to focus beams for communication. One way to overcome LOS issues is by using CV2X technologies. In CV2X technology, a vehicle can communicate with at least one of one or more cellular networks, one or more vehicles, and/or one or more cellular configured devices. To communicate with other devices the CV2X technology may use antennas that are compatible with mmW communication systems. An antenna may include one or more antennas, antenna elements, and/or antenna arrays. Various antenna designs and corresponding transmission techniques for arrays of antennas and antenna elements are well known.

Referring again to FIG. 1, in certain aspects, one or more UEs 104 may be configured for CV2X communications between UEs 104. The UEs 104 may include various devices related to vehicles and transportation. For example, the UEs 104 may include vehicles, devices within vehicles, and transportation infrastructure such as roadside devices, tolling stations, fuel supplies, or any other device that that may communicate with a vehicle. A UE 104 may act as either a host device or a client device for CV2X communication. A host UE 104a may advertise CV2X services supported by the host UE 104. A client UE 104b may discover CV2X services supported by the host UE 104. Moreover, a UE 104 may act as both a host and a client. For example, a vehicle may act as a host to provide speed and braking updates to surrounding vehicles and/or act as a client to communicate with a tolling station. Additionally, any UE 104 may include a coordination component 194 and act as a relay node to coordinate communication between other UEs 104 by scheduling resources for the communication. When acting as a host UE or a client UE, a UE 104 may utilize a connection component 196 to interact with a relay node to establish a communication channel with another UE using reserved resources. Accordingly, a single UE 104 may include both a coordination component 194 and a connection component 196. Further details of the coordination component 194 and the connection component 196 are illustrated in FIG. 10 and FIG. 11.

Figure 10:
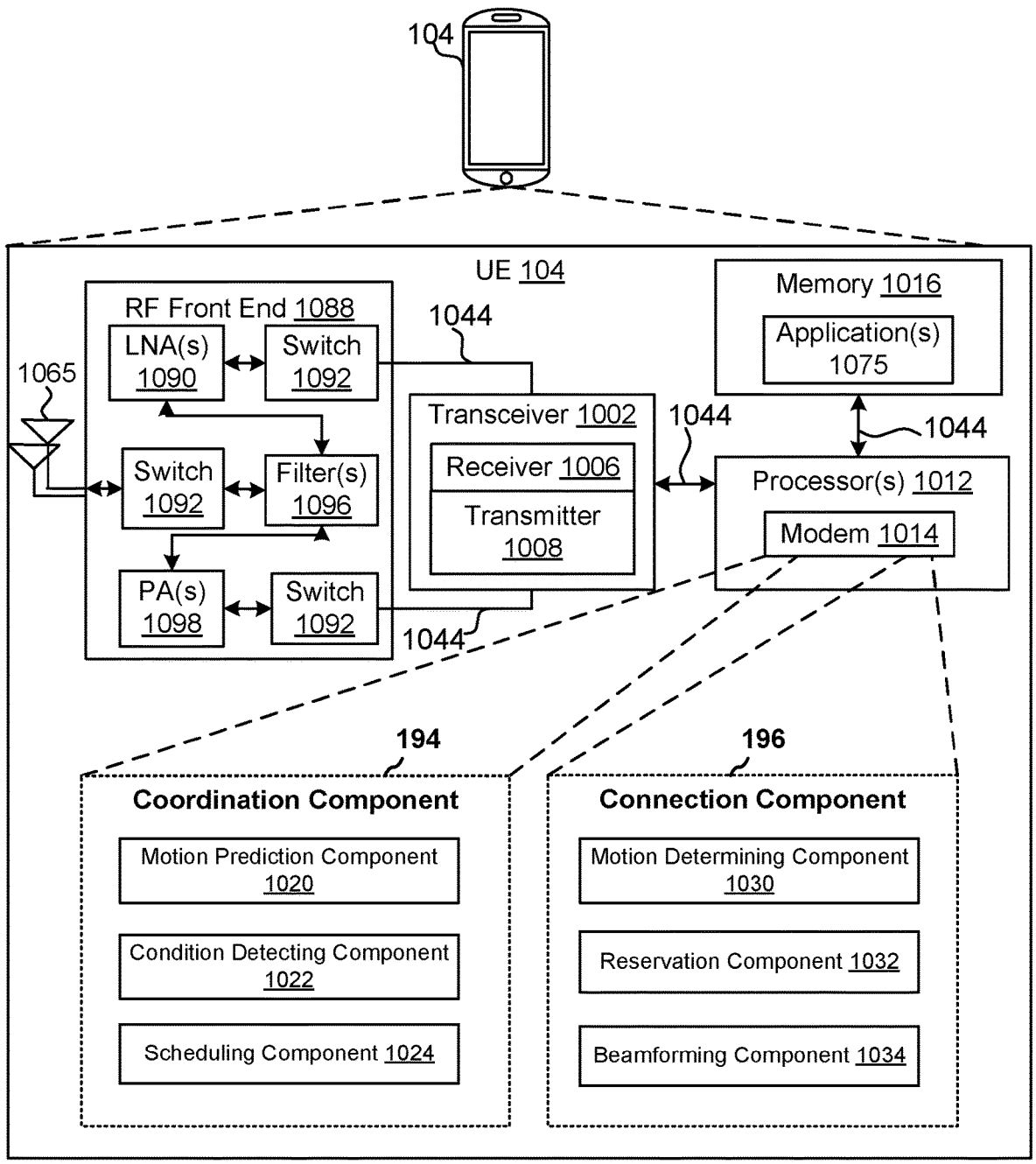
FIG. 10 is a schematic diagram of example components of the UE of FIG. 1.
Figure 11:
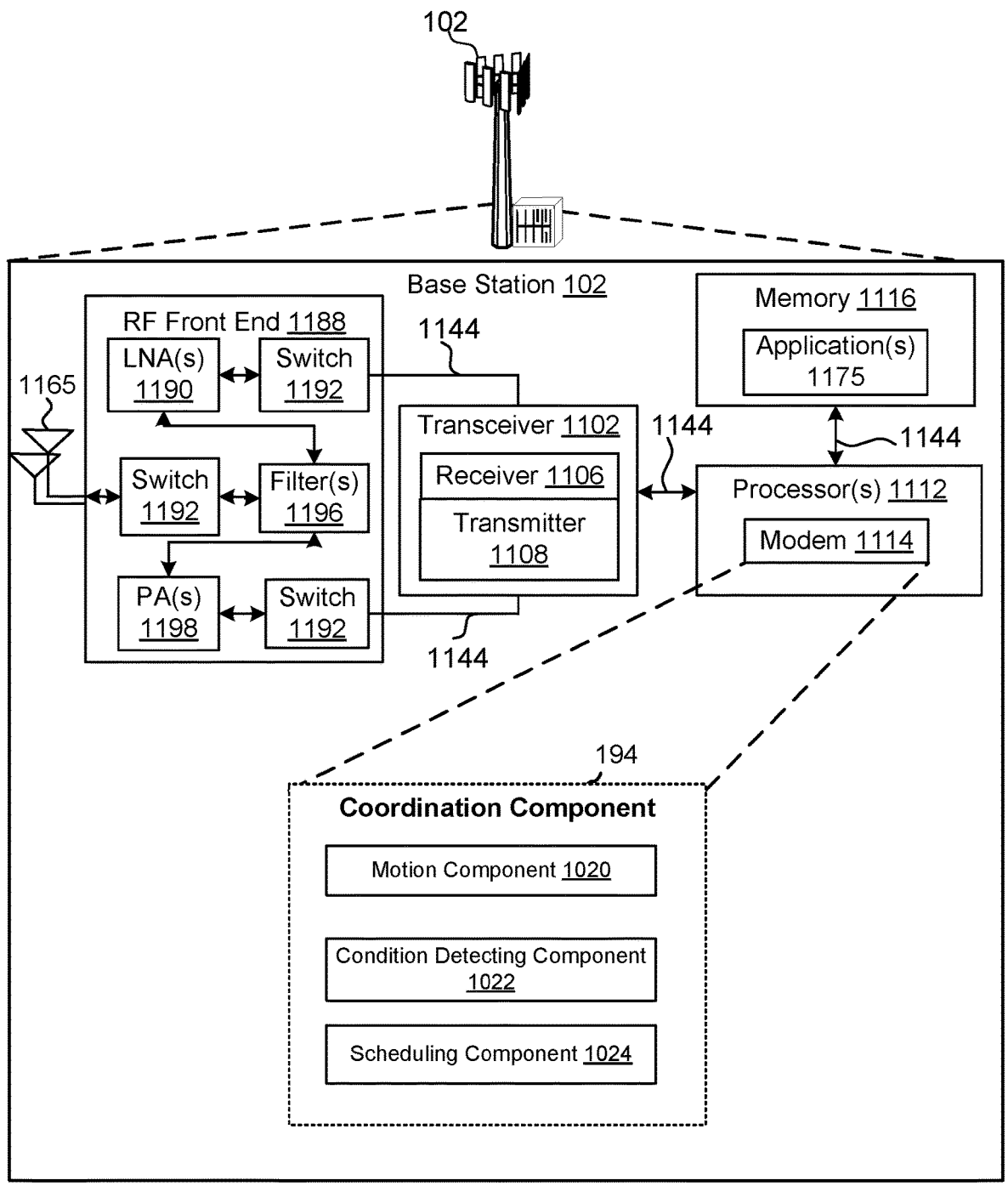
FIG. 11 is a schematic diagram of example components of the base station of FIG. 1.

Referring to FIG. 10 and FIG. 11, the coordination component 194 may include a motion prediction component 1020, a condition detecting component 1022, and a scheduling component 1024. The motion prediction component 1020 may determine a predicted motion of one or more other UEs, which may be located in vehicles. In an aspect, the motion prediction component 1020 may receive information regarding the predicted motion of a vehicle via an established communication channel with the corresponding UE. For example, the motion prediction component 1020 may subscribe to a service provided by the corresponding UE that provides the predicted motion of the vehicle, which may include, for example, position, heading, and speed. The motion prediction component 1020 may forward the predicted motion to other UEs. The coordination component 194 may include a condition detecting component 1022 for determining whether two UEs are likely to satisfy a communication condition based on the predicted motion of each UE or vehicle. For example, the condition detecting component 1022 may compare the predicted motions to determine whether a line of sight is predicted at a future time between the two UEs, whether the two UEs are predicted to be within a certain range, whether the two UEs are predicted to be closer to each other than to the relay node, or other conditions that may indicate that communication between the two UEs is beneficial. The condition detecting component 1022 may determine whether one or both of the UEs has relevant information to share with the other UE based on information that the relay node has received regarding each UE or associated vehicle. For example, the condition detecting component may determine whether a UE hosts a traffic information service. The coordination component 194 may include a scheduling component 1024 for reserving radio resources for establishing a communication channel between the two other UEs. The scheduling component 1024 may schedule a communication between the two other UEs by selecting available resources. The scheduling component 1024 may transmit an indication of the reserved resources to each UE.

The connection component 196, shown in FIG. 10, may include a motion determining component 1030, a reservation component 1032, and a beamforming component 1034. Similar to the motion prediction component 1020, the motion determining component 1030 may determine first predicted motion of a first vehicle. The first vehicle may be associated with a UE 104a, which may include the connection component 196. For example the UE 104a may be integrated with the vehicle or may be located within the vehicle. The motion determining component 1030 may be in communication with a vehicle system that controls vehicle operation such as an autonomous driving control system. Accordingly, the motion determining component 1030 may obtain the first predicted motion of the first vehicle from the autonomous driving control system that controls the motion of the first vehicle. In another aspect, the motion determining component 1030 may independently predict vehicle movement based on, for example, sensors and/or a navigation function. The motion determining component 1030 may transmit the first predicted motion, for example, by hosting a traffic information service and periodically sending indications of predicted motion to subscribers. The connection component 196 may include a reservation component 1032 for receiving an indication that the UE 104a will be in a communication condition and that resources have been reserved for a communication channel with another UE 104b, which may have information useful to the UE 104a. The indication may include predicted position information for the other UE at the time of the communication condition. The connection component 196 may determine whether the UE 104 should establish the communication channel with the other UE. The connection component 196 may include a beamforming component 1034 for communicating with the other UE using the reserved resources. For example, the beamforming component 1034 may determine contents of the communication using the reserved resources. The beamforming component 1034 may determine a transmission and/or reception beams to use for the communication. For example, the transmission and/or reception beam may be based on a relative position of the UE and the other UE at the time of the communication condition.

Figure 2:
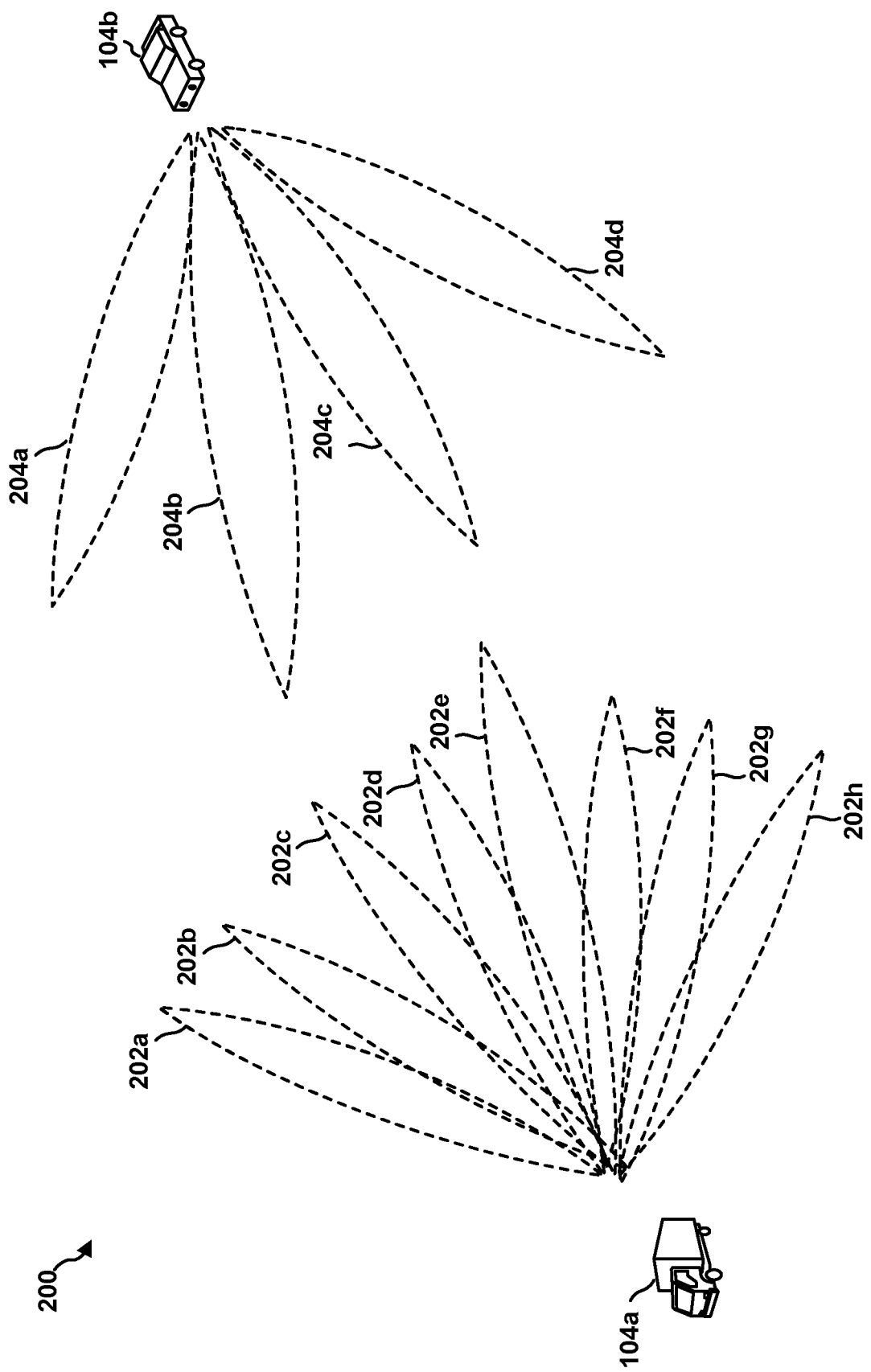
FIG. 2 is a block diagram of example UEs communicating using beamforming.

FIG. 2 is a diagram 200 illustrating a host UE 104a in communication with a client UE 104b. Referring to FIG. 2, the host UE 104a may transmit one or more beams 202a, 202b, 202c, 202d, 202e, 202f, 202g, or 202h to the client UE 104b, where the beams may be in one or more directions. The client UE 104b may receive the one or more beams 202a-202h in the same direction as transmitted by the host UE 104a or in another direction due to reflection. The client UE 104b may also transmit one or more beams 204a, 204b, 204c, and 204d to the host UE 104a, where the beams may be in one or more directions. The host UE 104a may receive the one or more beams 204a-204d in the same direction as transmitted by the client UE 104b or in another direction due to reflection. The host UE 104a and/or the client UE 104b may perform beam training to determine the best beams for each of the host UE 104a/the client UE 104b to transmit/receive.

The use of beamforming may impact discovery signals for CV2X communication. In some conventional D2D systems, discovery signals are broadcast by a host device to allow other devices to discover services offered by the host device. When beamforming is used to transmit a discovery signal, devices that are not positioned directly within the beam may not receive the signal. In an aspect, multiple transmissions of a discovery signal may be used to perform beam sweeping by transmitting the discovery signal in different directions. The multiple transmissions, however, may increase resource usage for the discovery signal.

In a CV2X scenario, movement of one or more vehicles associated with UEs 104 may impact discovery signals. In particular, if the relative position of the UEs is rapidly changing, e.g., in the case of passing vehicles, the best beam may also change quickly. Once a communication channel is established, the UEs may provide estimates of movement to improve beam tracking. The present disclosure provides for a relay node to help establish a communication channel between two UEs without the need to perform a discovery procedure using beam sweeping.

Figure 3:
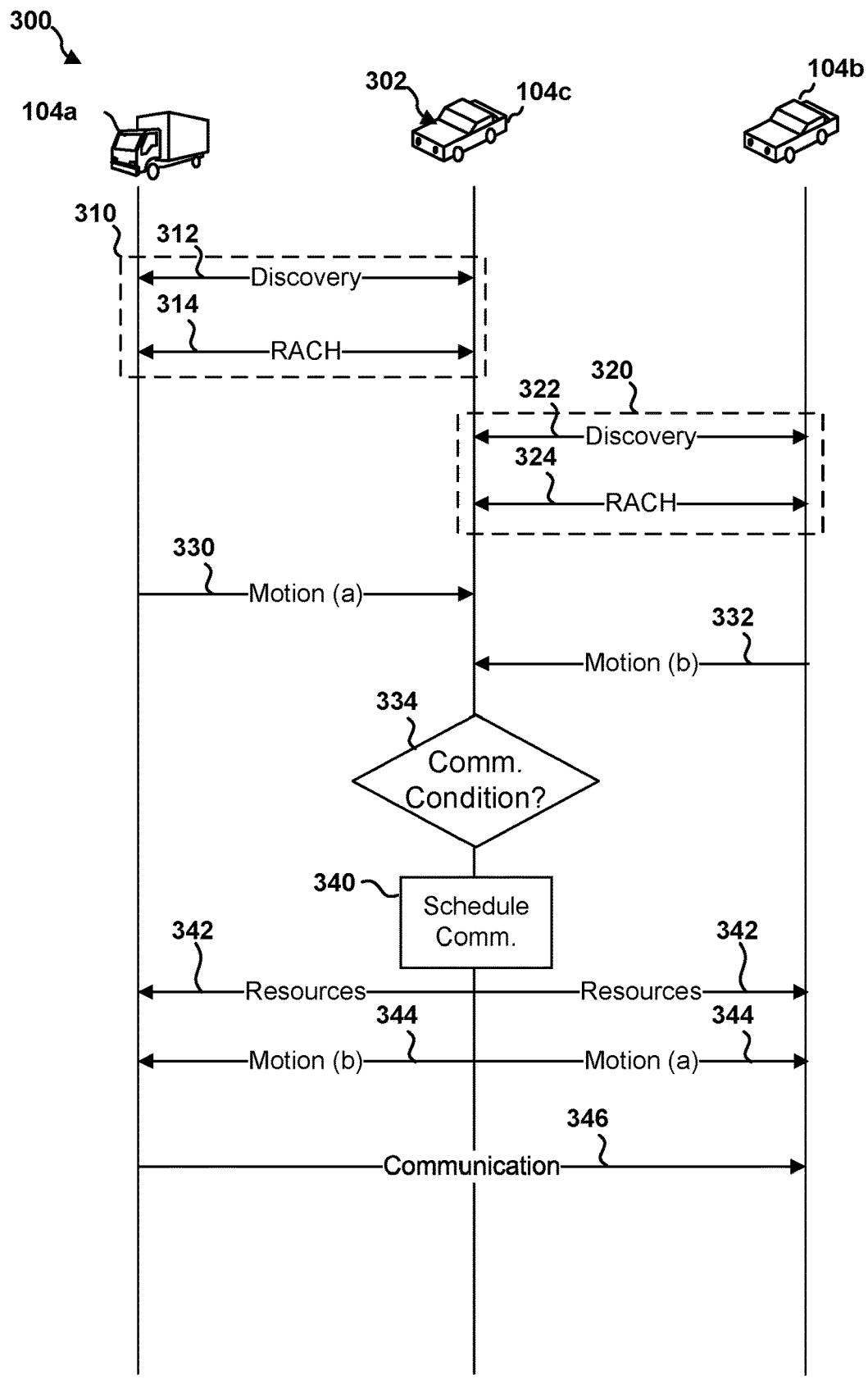
FIG. 3 is a message diagram showing an example of establishing a communication channel between UEs using a relay node.
Figure 6:
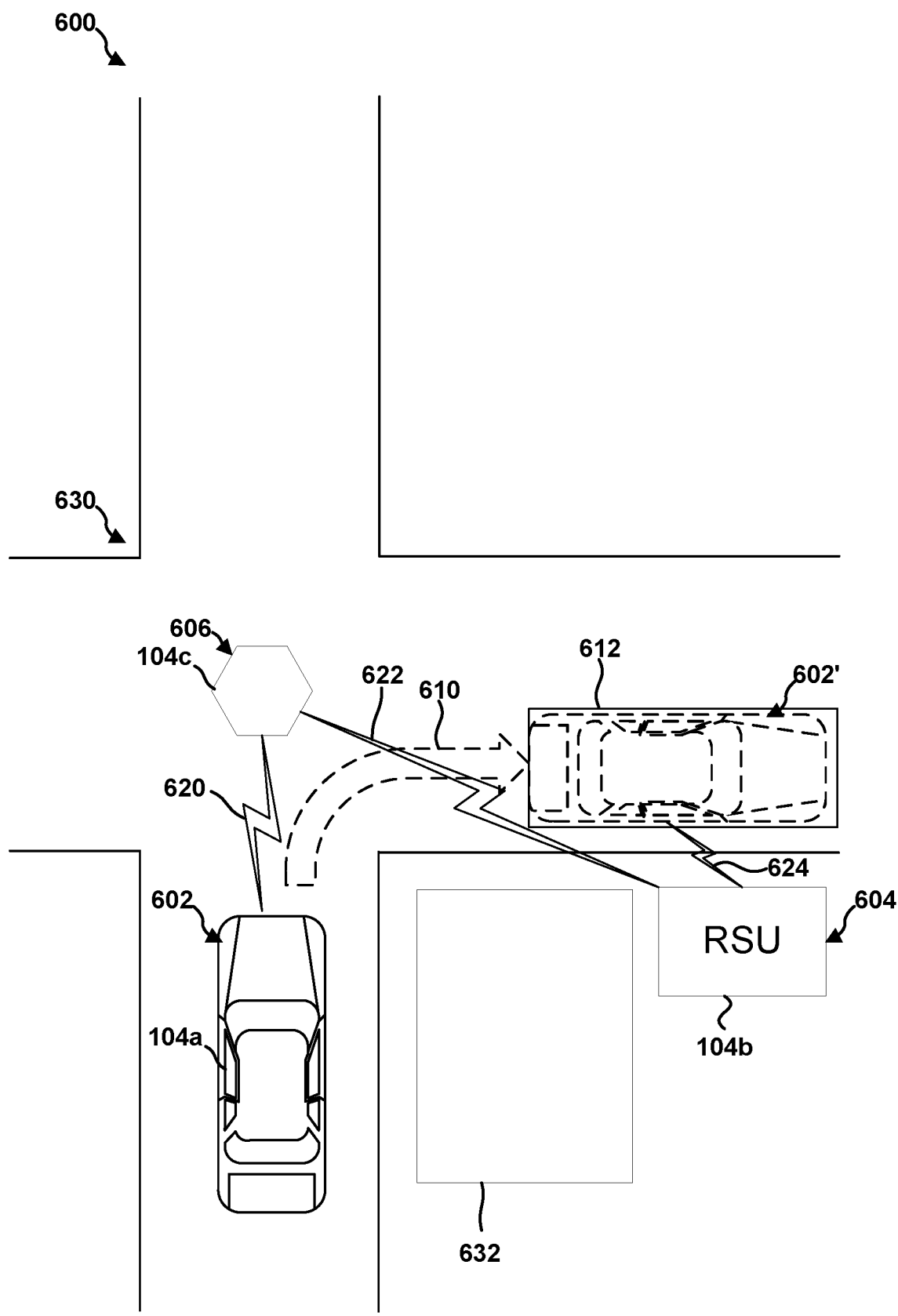
FIG. 6 is a schematic diagram showing a second example scenario for using predictive scheduling with a relay node coordinating the establishment of a communication channel between two UEs.

Referring to FIG. 3, a message diagram 300 shows assisted scheduling of communications between a first UE 104a and a second UE 104b with the assistance of a relay node 302, which may be, for example, a third UE 104c. In an aspect, each of the first UE 104a, the second UE 104b, and the third UE 104c may be located in a different vehicle. In another aspect (e.g., as illustrated in FIG. 6), one or more of the UEs may be in a fixed location, such as a traffic control device or road side unit.

At 310, the first UE 104a and the third UE 104c may establish a first communication channel. In an aspect, for example, the first UE 104a and the third UE 104c may perform a device to device discovery procedure 312 and a RACH procedure 314. In another aspect, establishing the first communication channel may use the techniques described herein using assisted scheduling, for example, using another relay node (not shown) to establish the first communication channel.

At 320, the second UE 104b and the third UE 104c may establish a second communication channel. In an aspect, for example, the second UE 104b and the third UE 104c may perform a device to device discovery procedure 322 and a RACH procedure 324. In another aspect, establishing the second communication channel may use the techniques described herein using assisted scheduling, for example, using another relay node (not shown) to establish the first communication channel.

At 330, the first UE 104a may transmit a first predicted motion of the first UE 104a to the third UE 104c. The first predicted motion may be based on information from the vehicle associated with the first UE 104a. The first predicted motion may be, for example, a current position and a current velocity vector, a planned velocity vector, or planned trajectory, or other indication of where the UE 104a expects to be located at a future time. Similarly, at 332, the second UE 104b may transmit a second predicted motion of the second UE 104b to the third UE 104c. The second predicted motion may be based on information from a vehicle associated with the second UE 104b. In a case where the second UE 104b is associated with a stationary device, the second predicted motion may indicate no motion, or may not be transmitted, in which case the second UE 104b may determine that the position of the second UE 104b is unlikely to change. In the case where there is no transmission from the second UE 104b, which is stationary, the location of the second UE 104b may be known a priori to the third UE 104c, e.g., via pre-configuration. The actions 330 and 332 may be performed periodically via the established first communication channel and the second communication channel. The predicted motion may be used by the third UE 104c to maintain the first communication channel and the second communication channel, for example, by performing beam tracking. Additionally, the third UE 104c may provide predicted motion information to the first UE 104a and the second UE 104b to maintain the respective communication channels.

At 334, the third UE 104c may determine whether a communication condition between the first UE 104a and the second UE 104b will exist at a time in the future based on the predicted motion information. For example, a communication condition may occur when the first UE 104a obtains a line of sight to the second UE 104b. Further examples of communication conditions are discussed in further detail below with respect to FIGS. 5-7.

At 340, the third UE 104c may schedule a communication between the first UE 104a and the second UE 104b by reserving resources for the communication. The resources may be, for example, time and frequency domain resource elements. In an aspect, a carrier frequency for CV2X communications may be pre-established and the third UE 104c may reserve a slot or transmission opportunity in the time domain for the communication. The third UE 104c may schedule the communication based on other reserved resources including resources used for the first communication channel and the second communication channel. In an aspect, the third UE 104c may act as a relay conduit for communication between the first UE 104a and the second UE 104b such that the first UE 104a and the second UE 104b negotiate to schedule the reserved resources. In another aspect, the third UE 104c may act as a controller to determine when the first UE 104a and the second UE 104b will need to communicate and schedule the reserved resources (e.g., transmission opportunities) based on the determined future usage.

At 342, the third UE 104c may transmit an indication of the scheduled resources to the first UE 104a and the second UE 104b. The indication of the scheduled resources may indicate which UE will transmit and which UE will receive, and the time and frequency of the scheduled resource. The indication may include the beam directivity for the UE 104a and UE 104b to transmit and receive with the scheduled resource. If a fine narrow beam is preferred for the scheduled communication, an indication of a need of conducting a beam-refining procedure may be included. The indication may include corresponding parameters about when and how to do beam refining. Additionally, the indication may include identifiers of each of the first UE 104a and the second UE 104b, and transmission parameters such as numerology, modulation and coding scheme (MCS), and power control-related parameters.

At 344, the third UE 104c may transmit motion or position information to each of the first UE 104a and the second UE 104b. In an aspect, the motion or position information may be included in a transmission carrying the resource information. The motion or position information may allow each of the first UE 104a and the second UE 104b to determine the relative location of the other UE at the time of the resource reservation. The first UE 104a and the second UE 104b may use the relative location of the other UE to determine a beam to use for the communication. In an aspect, the indication 344 may be combined with the earlier indication 342 and delivered to UE 104a or UE 104b as a single communication transaction.

At 346, the first UE 104a and the second UE 104b may communicate using the reserved resources. For example, the first UE 104a may transmit information to second UE 104b. In an aspect, the communication at action 346 may occur without a discovery procedure or RACH procedure occurring between the first UE 104a and the second UE 104b. Accordingly, the communication at action 346 may be scheduled at the time when the communication condition is predicted to occur without delay due to the discovery procedure or RACH procedure. For example, once the first UE 104a and the second UE 104b have a line of sight, the first UE 104a and the second UE 104b may transmit traffic without needing to wait for discovery resources or to send discovery or RACH signaling.

Figure 4:
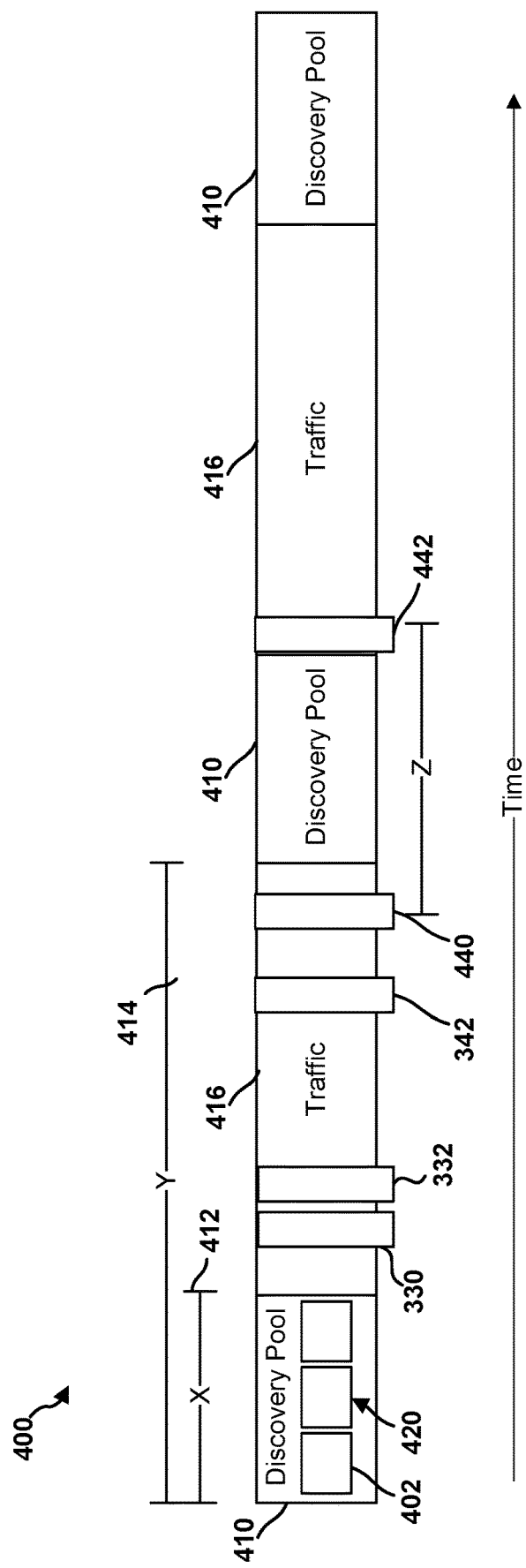
FIG. 4 is a resource diagram showing an example timing for establishing a communication channel between UEs using a relay node.

Turning to FIG. 4, a resource diagram 400 show an example allocation of discovery resources 402 in discovery pools 410 and traffic resources 416 that may be allocated for CV2X communications. In an aspect, the discovery resources 402 may be allocated across multiple communications networks. For example, the discovery resources 402 may be specified by a regulatory agency or a standards setting organization. In another aspect, the discovery resources 402 may be allocated by a network operator on a licensed portion of spectrum. The base stations 102 may transmit an indication of the discovery resources 402 as system information. In another aspect, the discovery resources 402 may be allocated by a regulatory agency or standards setting organization within a particular portion of a network operator's licensed spectrum. For example, a standard may define a lowest frequency portion of the network operator's licensed spectrum to periodically be used as the discovery resources 402.

As illustrated in FIG. 4, the preconfigured discovery resources may include discovery pools 410 of discovery resources 402 that may be allocated a constant bandwidth in the frequency-domain and periodically allocated in the time-domain. A discovery pool 410 may be defined by a duration X 412 and a periodicity Y 414. The discovery pools 410 may include discovery bursts 420. A discovery burst 420 may be a set of resources including resources allocated for a discovery procedure and/or a RACH procedure. Traffic resources 416 may include the frequency-domain resources between the discovery pools 410 and may be used for carrying traffic. In an aspect, the periodicity Y 414 may be a multiple of the duration X 412. For example, the duration X 412 may be 1 second and the periodicity Y 414 may be 10 or 20 seconds.

In an aspect, the assisted scheduling of communications may utilize traffic resources 416 to establish a communication channel. For example, the actions 330 and 332 conveying predicted motion may use traffic resources 416. The UE 104c may determine that a communication condition 440 may occur before the next discovery pool 410. Accordingly, if the UE 104a and 104b perform a discovery procedure, the UEs may not be able to exchange traffic until a time 442, which may be after a subsequent discovery pool 410. In contrast, according to the present disclosure, the UE 104c may predictively schedule resources at the time of the communication condition 440 using indications 342 of reserved resources. Accordingly, a delay Z between the start of a communication condition and the exchange of traffic may be greatly reduced or eliminated. In the example discussed above where the duration X 412 and the periodicity Y 414 of the discovery pool 410 is on the order of seconds, the predictive scheduling may allow faster exchange of information, which may be useful, for example, in vehicle control applications.

Figure 5:
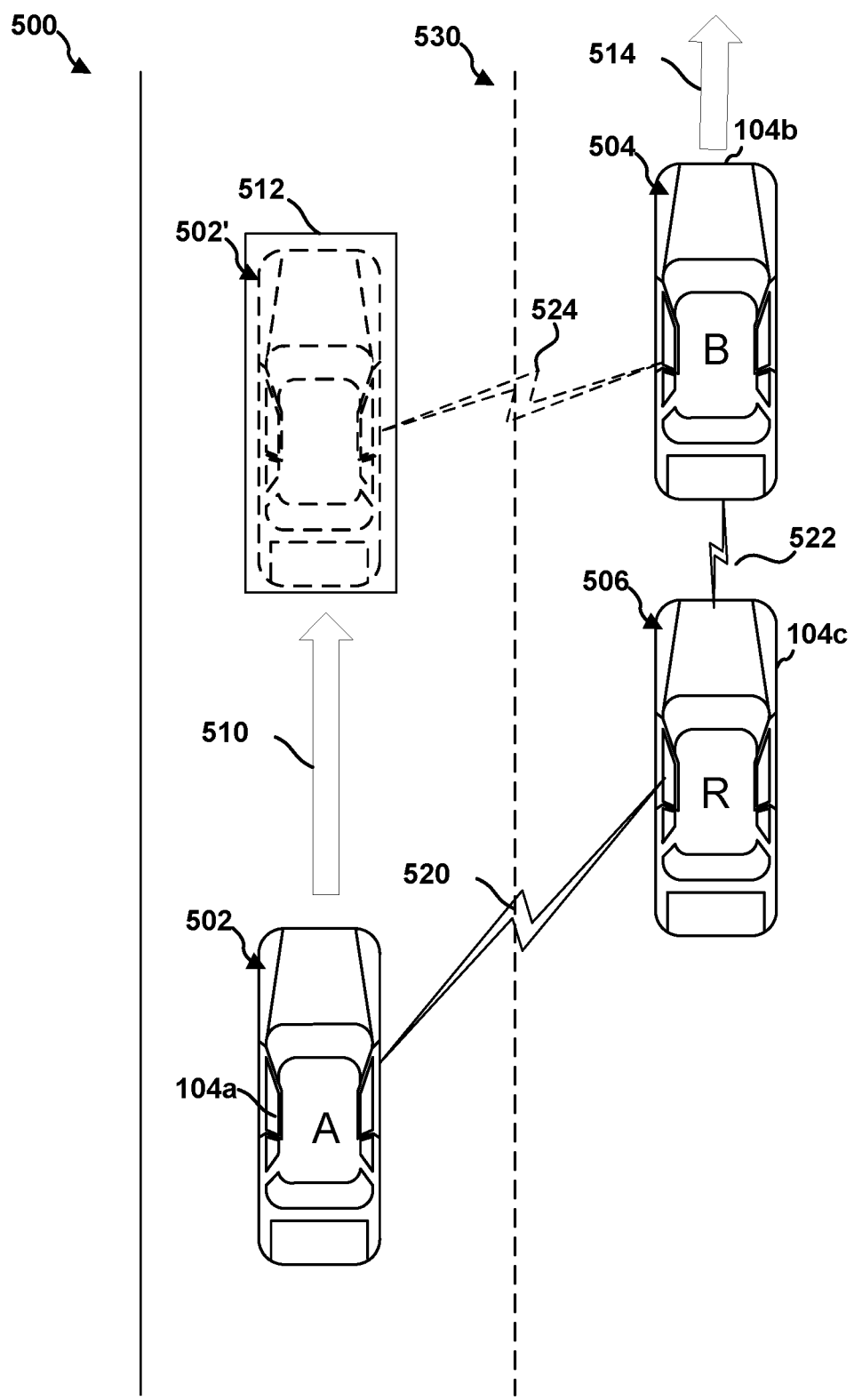
FIG. 5 is a schematic diagram showing a first example scenario for using predictive scheduling with a relay node coordinating the establishment of a communication channel between two UEs.

FIG. 5 schematically illustrates an example scenario 500 for predictive scheduling. In the scenario 500, a first vehicle 502 (which may include UE 104a) may be travelling on a road 530, which may include a left lane and a right lane. The first vehicle 502 may be travelling in the left lane and a speed of the first vehicle 502 may be greater than a speed of a third vehicle 506 (which may include the UE 104c and may be considered a relay node) travelling in the right lane. Accordingly, the UE 104a may determine, based on the relative speeds, that the first vehicle 502 is likely to pass the third vehicle 506. The first vehicle 502 may have previously established a first communication channel 520 with the third vehicle 506 (e.g., between UE 104a and UE 104c). The third vehicle 506 may have also previously established a second communication channel 522 with a second vehicle 504 (which may include the UE 104b) travelling in front of the third vehicle 506 in the right lane. The first vehicle 502 may not initially have a communication channel with the second vehicle 504, for example, because the third vehicle 506 is blocking a line of sight, or because the first vehicle 502 and the second vehicle 504 have not discovered each other using discovery signals. In this scenario 500, the third vehicle 506 or the UE 104c may act as a relay node to schedule communications between the first vehicle 502 and the second vehicle 504.

The first vehicle 502 may be travelling at a greater speed than the third vehicle 506. The first vehicle 502 may determine a first predicted motion 510 relative to the third vehicle 506. Accordingly, the first vehicle 502 may move to a position 512 relative to the third vehicle 506 and the second vehicle 504 such that a communication condition occurs. For example, at the position 512, the first vehicle 502' may have a line of sight to the second vehicle 504. The first vehicle 502 may transmit the first predicted motion 510 to the third vehicle 506 via the first communication channel 520. The second vehicle 504 may also determine a second predicted motion 514 and transmit the second predicted motion 514 to the third vehicle 506 via the second communication channel 522. The third vehicle 506 may determine that a communication condition (e.g., a line of sight) exists at the time the first vehicle 502 is predicted to reach the position 512. Accordingly, the third vehicle 506 may reserve resources (e.g., a transmission opportunity) for the first vehicle 502 and the second vehicle 504 to communicate. The selection of the beams to be used for the communication may be left to the UE 104a and the UE 104b at the respective vehicles 502, 504. The third vehicle 506 may assist with the selection of the beams by providing position information (e.g., predicted motion 510, 514) to each of the vehicles 502, 504. In another aspect, the third vehicle 506 may also provide beam information (e.g., recommended beams) directly to the respective vehicles 502, 504.

FIG. 6 schematically illustrates another example scenario 600 for predictive scheduling. In the scenario 600, a first vehicle 602 may be approaching an intersection 630 and may have previously established a first communication channel 620 with a traffic control device 606, which may include the UE 104c. The traffic control device 606 may also have an established second communication channel 622 with a road side unit (RSU) 604, which may include the UE 104b. Communication between the first vehicle 602 and the RSU 604 may be blocked by an obstacle 632, such as a building. The first vehicle 602 may be planning to follow a first predicted motion 610 (e.g., a trajectory) that will bring the first vehicle 602 to a position 612, where the vehicle 602' may be in a communication condition with the RSU 604. The traffic control device 606 may determine that the communication condition will exist based on the first predicted motion 610 and the fixed position of the RSU 604. The traffic control device 606 may reserve resources for the first vehicle 602 to communicate with the RSU 604 using the communication channel 624 in a similar manner as discussed with respect to FIG. 5 above.

Figure 7:
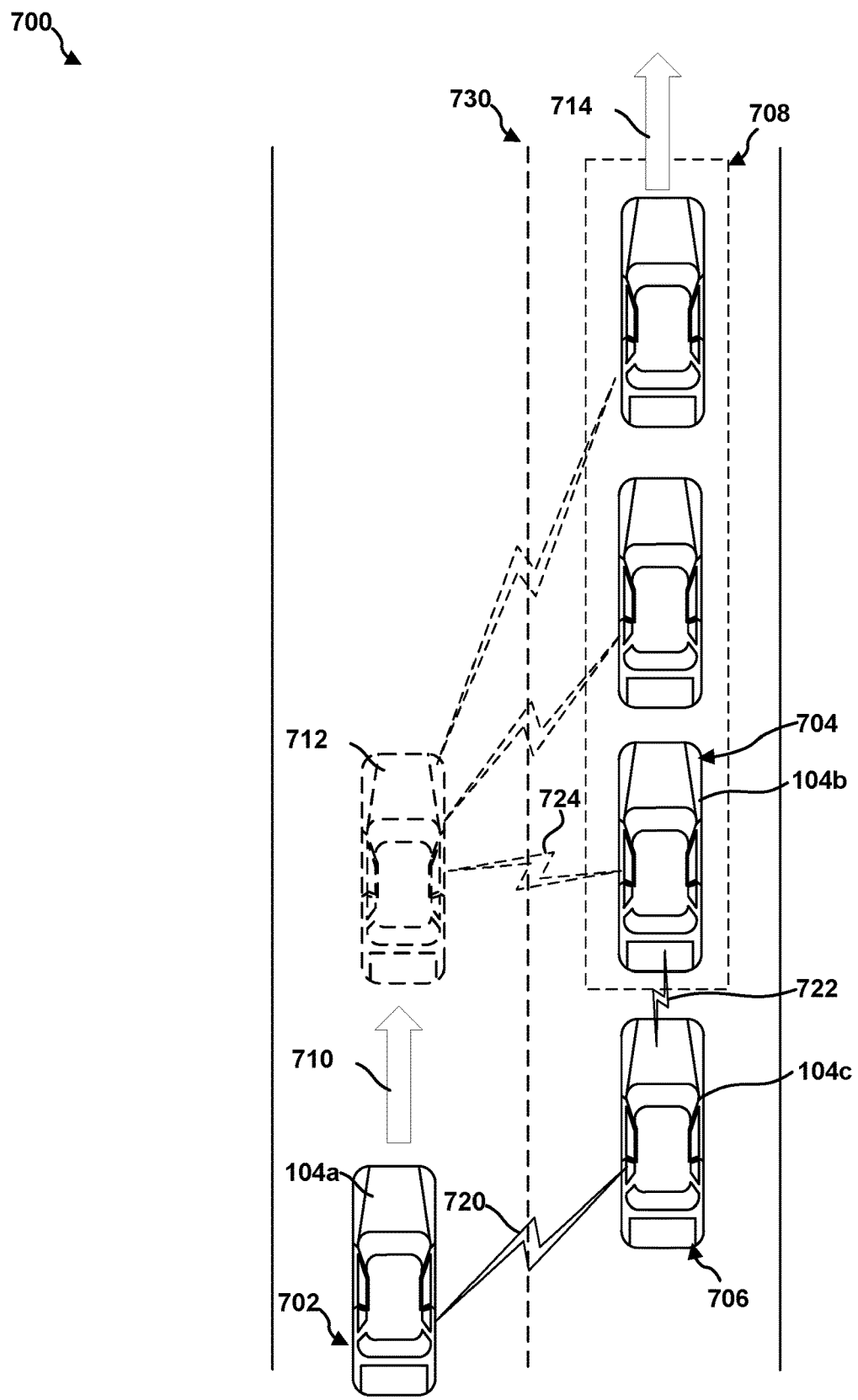
FIG. 7 is a schematic diagram showing a third example scenario for using predictive scheduling with a relay node coordinating the establishment of a communication channel between two UEs.

FIG. 7 illustrates another example scenario 700 for predictive scheduling. The scenario 700 may be similar to the scenario 500 in that a first vehicle 702 may be passing a vehicle 706. In the scenario 700, the first vehicle 702 (which may include UE 104a) may be travelling on a road 730, which may include a left lane and a right lane. The first vehicle 702 may be travelling in the left lane and planning to pass a third vehicle 706 (which may include the UE 104c) travelling in the right lane. The first vehicle 702 may have previously established a first communication channel 720 with the third vehicle 706 (e.g., between UE 104a and UE 104c). The third vehicle 706 may have also previously established a second communication channel 722 with a second vehicle 704 (which may include the UE 104b) travelling in front of the third vehicle 706 in the right lane. The second vehicle 704 may be a member of a platoon 708 of vehicles. The member vehicles of the platoon 708 may have established communication channels among the platoon 708 and may share a predicted motion 714. For example, each vehicle in the platoon 708 may plan to travel according to the predicted motion 714, which may be communicated among the platoon from a lead vehicle. The vehicle 702 may not initially have a communication channel with the second vehicle 704 or any other vehicle in the platoon 708.

In this scenario 700, the vehicle 706 or the UE 104c may act as a relay node to schedule communications on a third communication channel 724 between the first vehicle 702 and the second vehicle 704 as well as each of the other vehicles in the platoon 708 with the second vehicle 704. The vehicle 706 may reserve resources for communication with each vehicle in the platoon 708, e.g., as described above with respect to FIG. 5. Those reserved communications can be arranged sequentially as the vehicle 702 will pass the vehicles in the platoon in a predictable speed in turn or, can be arranged in approximately at the same time with different beam directivities to be used by vehicle 702 to communicate with different vehicles in the platoon 708. The choice may depend on the size (e.g., length) of the platoon 708, and other factors, such as whether there is a blocking object between the vehicle 702 and one or more platoon members.

Figure 8:
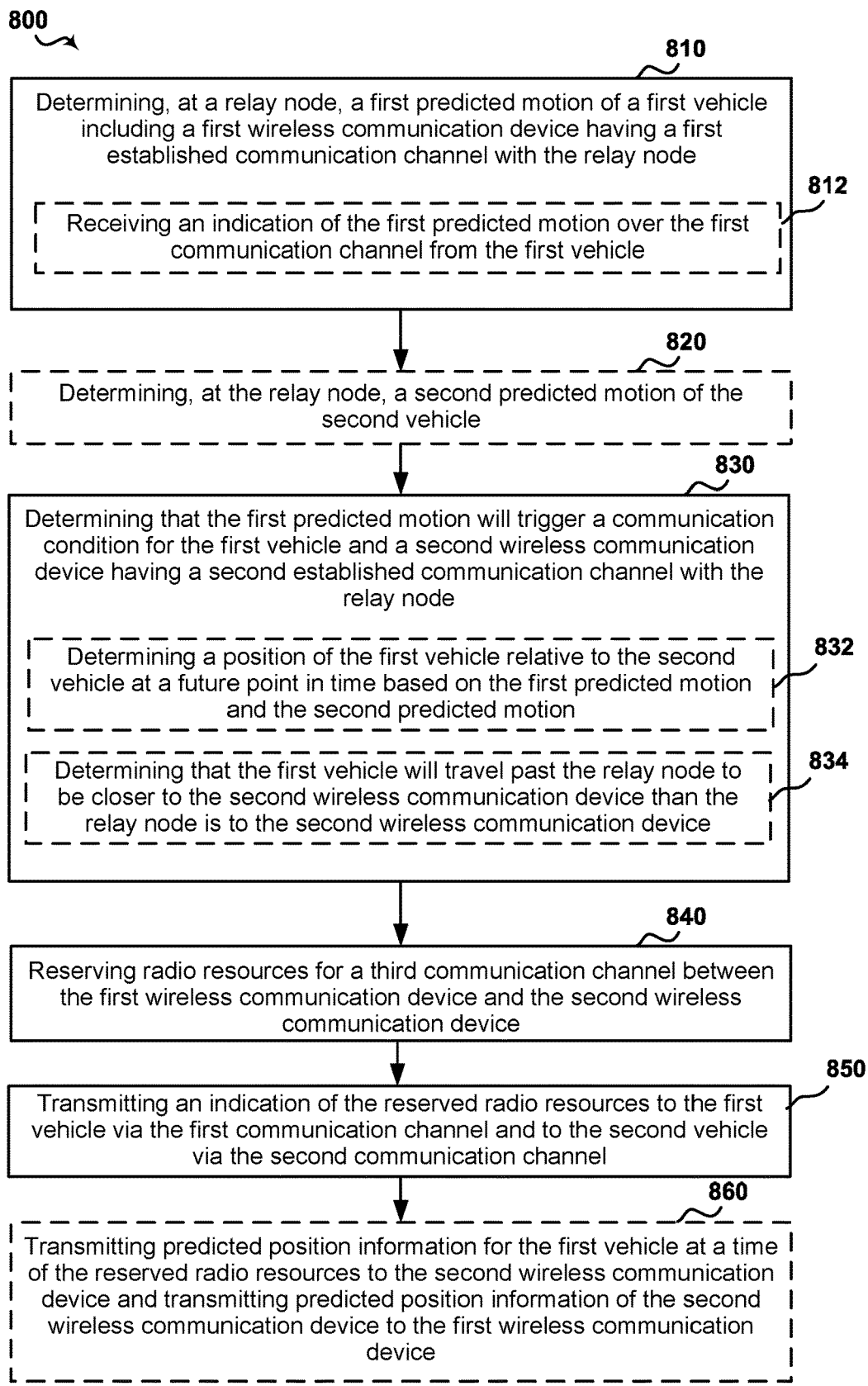
FIG. 8 is a flowchart of an example method of wireless communication by a relay node.

FIG. 8 is a flowchart of a method 800 of wireless communication for a host UE 104a or base station 102 in a CV2X system. The method 800 may be performed by an apparatus such as the coordination component 194 in conjunction with the processor 1012 of the UE 104c or a base station 102. The apparatus may be referred to as a relay node. Optional blocks are shown in dashed lines.

At block 810, the method 800 may include determining, at a relay node, a first predicted motion of a first vehicle including a first wireless communication device having a first established communication channel with the relay node. In an aspect, for example, the coordination component 194 at the UE 104c of the relay node may execute the motion prediction component 1020 to determine a first predicted motion of a first vehicle 502, 602, 702 including a first wireless communication device (e.g., UE 104a in FIGS. 5-7) having a first established communication channel 520, 620, 720 with the relay node. In an aspect, at sub-block 812, block 810 may optionally include receiving an indication of the first predicted motion over the first communication channel from the first vehicle. In an aspect, for example, the coordination component 194 may execute the motion prediction component 1020 to receive the indication of the first predicted motion over the first communication channel 520, 620, 720 from the first vehicle 502, 602, 702.

At block 820, the method 800 may optionally include determining, at the relay node, a second predicted motion of a second vehicle. In an aspect, for example, the coordination component 194 may execute the motion prediction component 1020 to determine the second predicted motion 514, 714 of the second vehicle 504, 704. Determining the second predicted motion may include receiving an indication of the second predicted motion over a second communication channel with the second vehicle.

At block 830, the method 800 may include determining that the first predicted motion will trigger a communication condition for the first vehicle and a second wireless communication device having a second established communication channel with the relay node. In an aspect, for example, the coordination component 194 may execute the condition detecting component 1022 to determine that the first predicted motion 510, 610, 710 will trigger a communication condition for the first vehicle 502, 602, 702 and a second wireless communication device (e.g., UE 104b in FIGS. 5-7) having a second established communication channel 522, 622, 722 with the relay node (e.g., UE 104c in FIGS. 5-7). For example, the communication condition may be a line of sight between the first vehicle and the second wireless communication device. In an aspect, at sub-block 832, the block 830 may optionally include determining a position of the first vehicle relative to the second vehicle at a future point in time based on the first predicted motion and the second predicted motion. In an aspect, for example, the coordination component 194 may execute the condition detecting component 1022 to determine the position 512, 612, 712 of the first vehicle 502, 602, 702 relative to the second vehicle 504, 704 at a future point in time based on the first predicted motion 510, 610, 710 and the second predicted motion 514, 714. When the second wireless communication device is stationary, the predicted second motion may be zero or no motion. In an aspect, at sub-block 834, the block 830 may optionally include determining that the first vehicle will travel past the relay node to be closer to the second vehicle than the relay node is to the second vehicle. For example, the communication condition may include the first vehicle travelling past the relay node (e.g., UE 104c) to be closer to the second wireless communication device than the relay node is to the second wireless communication device.

In block 840, the method 800 may include reserving radio resources for a third communication channel between the first wireless communication device and the second wireless communication device. In an aspect, for example, the coordination component 194 may execute the scheduling component 1024 to reserve radio resources for a third communication channel 524, 624, 724, between the first wireless communication device (e.g., UE 104a) and the second wireless communication device (e.g., UE 104b).

In block 850, the method 800 may include transmitting an indication of the reserved radio resources to the first vehicle via the first communication channel and to the second vehicle via the second communication channel. In an aspect, for example, the coordination component 194 may execute the scheduling component 1024 to transmit the indication 344 of the reserved radio resources to the first vehicle 502, 602, 702 via the first communication channel and to the second wireless communication device (e.g., UE 104b) via the second communication channel.

Figure 9:
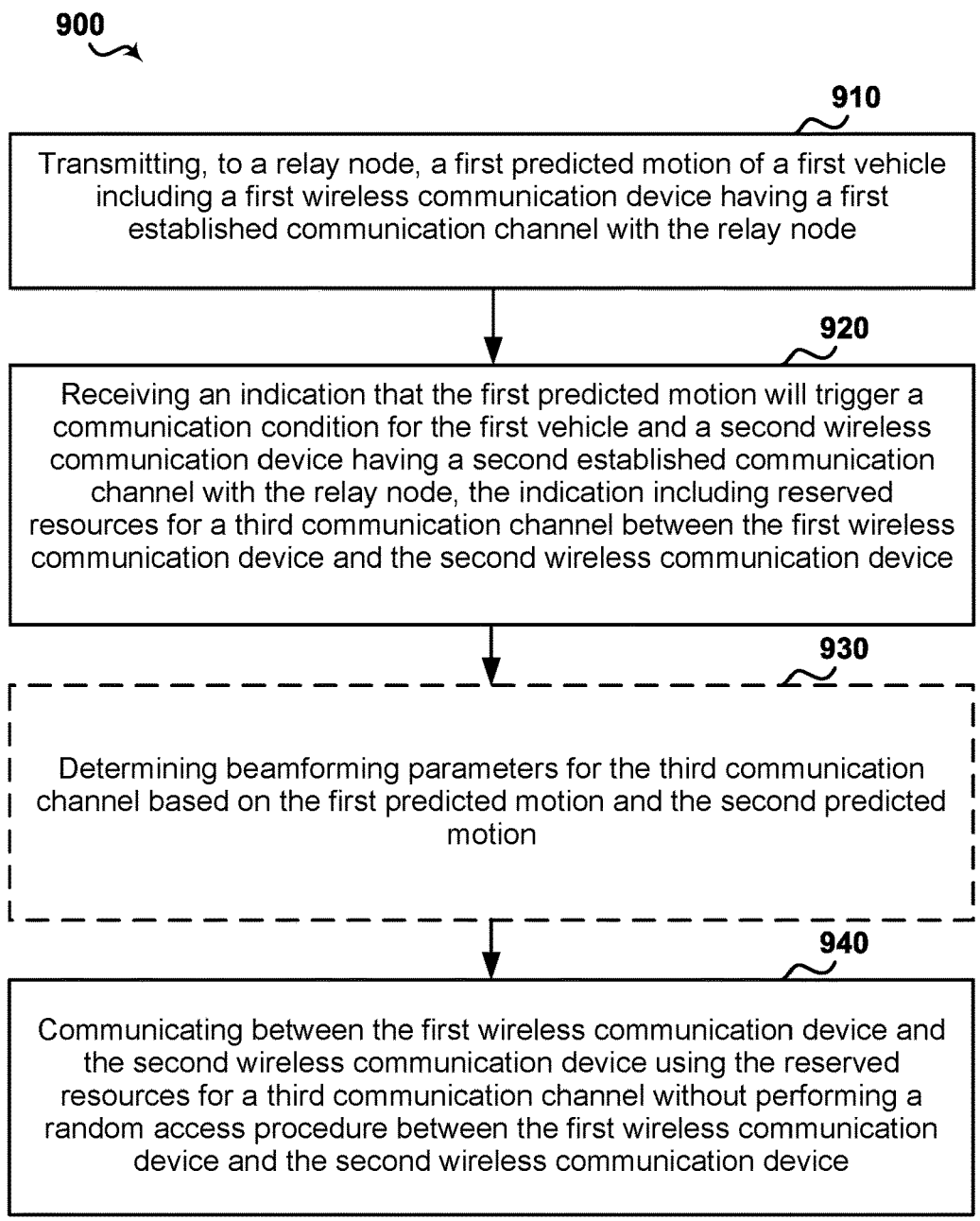
FIG. 9 is a flowchart of an example method of wireless communication by a UE.

In block 860, the method 800 may optionally include transmitting predicted position information for the first vehicle at a time of the reserved radio resources to the second wireless communication device and transmitting predicted position information of the second wireless communication device to the first wireless communication device. In an aspect, for example, the coordination component 194 may execute the motion prediction component 1020 to transmit the predicted position information for the first vehicle at a time of the reserved radio resources to the second wireless communication device and transmit the predicted position information of the second wireless communication device to the first wireless communication device FIG. 9 is a flowchart of a method 900 of wireless communication for a UE 104a or UE 104b, in a CV2X system, for example in the scenarios 500, 600, 700 in FIGS. 5-7, to establish a connection with another UE. The method 900 may be performed by an apparatus such as the connection component 196 of the UE 104a. The apparatus may be a vehicle, may be in a vehicle, or may be integrated with or communicatively connected to a vehicle, which may be referred to as the first vehicle. Optional blocks are shown in dashed lines.

In block 910, the method 900 may include transmitting, to a relay node, a first predicted motion of a first vehicle including a first wireless communication device having a first established communication channel with the relay node. In an aspect, for example, the connection component 196 may execute the motion determining component 1030 to transmit, to a relay node (e.g., UE 104c), a first predicted motion 510, 610, 710 of a first vehicle 502, 602, 702, including a first wireless communication device (e.g., UE 104a) having a first established communication channel 520, 620, 720 with the relay node.

In block 920, the method 900 may include receiving an indication that the first predicted motion will trigger a communication condition for the first vehicle and a second wireless communication device having a second established communication channel with the relay node, the indication including reserved resources for a third communication channel between the first wireless communication device and the second wireless communication device. In an aspect, for example, the connection component 196 may execute the reservation component 1032 to receive the indication 342 that the first predicted motion 510, 610, 710 will trigger a communication condition for the first vehicle and a second wireless communication device (e.g., UE 104b) having a second established communication channel 522, 622, 722, with the relay node. The indication 342 may include reserved resources for a third communication channel 524, 624, 724, between the first wireless communication device (e.g., UE 104a) and the second wireless communication device (e.g., UE 104b).

In block 930, the method 900 may optionally include determining beamforming parameters for the third communication channel based on the first predicted motion and the second predicted motion. In an aspect, for example, the connection component 196 may execute the beamforming component 1034 to determine the beamforming parameters for the third communication channel 524, 624, 724 based on the first predicted motion 510, 610, 710 and the second predicted motion 514, 714.

In block 940, the method 900 may include communicating between the first wireless communication device and the second wireless communication device using the reserved resources for a third communication channel without performing a random access procedure between the first wireless communication device and the second wireless communication device. In an aspect, for example, the connection component 196 may execute the beamforming component 1034 to communicate between the first wireless communication device (e.g., UE 104a) and the second wireless communication device (e.g., 104b) using the reserved resources for a third communication channel 524, 624, 724, without performing a random access procedure between the first wireless communication device and the second wireless communication device.

Referring to FIG. 10, one example of an implementation of UE 104 may include a variety of components, some of which have already been described above, but including components such as one or more processors 1012 and memory 1016 and transceiver 1002 in communication via one or more buses 1044, which may operate in conjunction with modem 1014, coordination component 194 and connection component 196 to enable one or more of the functions described herein related to discovery procedures for CV2X Further, the one or more processors 1012, modem 1014, memory 1016, transceiver 1002, RF front end 1088 and one or more antennas 1065, may be configured to support voice and/or data calls (simultaneously or non-simultaneously) in one or more radio access technologies.

In an aspect, the one or more processors 1012 can include a modem 1014 that uses one or more modem processors. The various functions related to coordination component 194 and connection component 196 may be included in modem 1014 and/or processors 1012 and, in an aspect, can be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 1014 associated with coordination component 194 and connection component 196 may be performed by transceiver 1002.

Also, memory 1016 may be configured to store data used herein and/or local versions of applications 1075, coordination component 194, connection component 196 and/or one or more of subcomponents thereof being executed by at least one processor 1012. Memory 1016 can include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes defining coordination component 194, connection component 196 and/or one or more of subcomponents thereof, and/or data associated therewith, when UE 104 is operating at least one processor 1012 to execute coordination component 194 and connection component 196 and/or one or more subcomponents thereof.

Transceiver 1002 may include at least one receiver 1006 and at least one transmitter 1008. Receiver 1006 may include hardware, firmware, and/or software code executable by a processor for receiving data, the code comprising instructions and being stored in a memory (e.g., computer-readable medium). Receiver 1006 may be, for example, a radio frequency (RF) receiver. In an aspect, receiver 1006 may receive signals transmitted by at least one base station 102. Additionally, receiver 1006 may process such received signals, and also may obtain measurements of the signals, such as, but not limited to, Ec/Io, SNR, RSRP, RSSI, etc. Transmitter 1008 may include hardware, firmware, and/or software code executable by a processor for transmitting data, the code comprising instructions and being stored in a memory (e.g., computer-readable medium). A suitable example of transmitter 1008 may including, but is not limited to, an RF transmitter.

Moreover, in an aspect, UE 104 may include RF front end 1088, which may operate in communication with one or more antennas 1065 and transceiver 1002 for receiving and transmitting radio transmissions, for example, wireless communications transmitted by at least one base station 102 or wireless transmissions transmitted by UE 104. RF front end 1088 may be connected to one or more antennas 1065 and can include one or more low-noise amplifiers (LNAs) 1090, one or more switches 1092, one or more power amplifiers (PAs) 1098, and one or more filters 1096 for transmitting and receiving RF signals.

In an aspect, LNA 1090 can amplify a received signal at a desired output level. In an aspect, each LNA 1090 may have a specified minimum and maximum gain values. In an aspect, RF front end 1088 may use one or more switches 1092 to select a particular LNA 1090 and its specified gain value based on a desired gain value for a particular application.

Further, for example, one or more PA(s) 1098 may be used by RF front end 1088 to amplify a signal for an RF output at a desired output power level. In an aspect, each PA 1098 may have specified minimum and maximum gain values. In an aspect, RF front end 1088 may use one or more switches 1092 to select a particular PA 1098 and its specified gain value based on a desired gain value for a particular application.

Also, for example, one or more filters 1096 can be used by RF front end 1088 to filter a received signal to obtain an input RF signal. Similarly, in an aspect, for example, a respective filter 1096 can be used to filter an output from a respective PA 1098 to produce an output signal for transmission. In an aspect, each filter 1096 can be connected to a specific LNA 1090 and/or PA 1098. In an aspect, RF front end 1088 can use one or more switches 1092 to select a transmit or receive path using a specified filter 1096, LNA 1090, and/or PA 1098, based on a configuration as specified by transceiver 1002 and/or processor 1012.

As such, transceiver 1002 may be configured to transmit and receive wireless signals through one or more antennas 1065 via RF front end 1088. In an aspect, transceiver may be tuned to operate at specified frequencies such that UE 104 can communicate with, for example, one or more base stations 102 or one or more cells associated with one or more base stations 102. In an aspect, for example, modem 1014 can configure transceiver 1002 to operate at a specified frequency and power level based on the UE configuration of the UE 104 and the communication protocol used by modem 1014.

In an aspect, modem 1014 can be a multiband-multimode modem, which can process digital data and communicate with transceiver 1002 such that the digital data is sent and received using transceiver 1002. In an aspect, modem 1014 can be multiband and be configured to support multiple frequency bands for a specific communications protocol. In an aspect, modem 1014 can be multimode and be configured to support multiple operating networks and communications protocols. In an aspect, modem 1014 can control one or more components of UE 104 (e.g., RF front end 1088, transceiver 1002) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Referring to FIG. 11, one example of an implementation of base station 102 may include a variety of components, some of which have already been described above, but including components such as one or more processors 1112 and memory 1116 and transceiver 1102 in communication via one or more buses 1144, which may operate in conjunction with modem 1114 and coordination component 194 to enable one or more of the functions described herein related to establishing a communication channel using a relay node.

The transceiver 1102, receiver 1106, transmitter 1108, one or more processors 1112, memory 1116, applications 1175, buses 1144, RF front end 1188, LNAs 1190, switches 1192, filters 1196, PAs 1198, and one or more antennas 1165 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

SOME FURTHER EXAMPLE EMBODIMENTS

An example method of wireless communications for a user equipment (UE), comprising: determining, at a relay node, a first predicted motion of a first vehicle including a first wireless communication device having an established first communication channel with the relay node; determining that the first predicted motion will trigger a communication condition for the first vehicle and a second wireless communication device having an established second communication channel with the relay node; reserving radio resources for a third communication channel between the first wireless communication device and the second wireless communication device; and transmitting an indication of the reserved resources to the first wireless communication device via the first communication channel and to the second wireless communication device via the second communication channel.

The above example method, wherein determining the first predicted motion comprises receiving an indication of the first predicted motion over the first communication channel from the first vehicle.

One or more of the above example methods, wherein the second wireless communication device is associated with a second vehicle, the method further comprising determining, at the relay node, a second predicted motion of the second vehicle.

One or more of the above example methods, wherein determining that the first predicted motion will trigger the communication condition comprises determining a position of the first vehicle relative to the second vehicle at a future point in time based on the first predicted motion and the second predicted motion.

One or more of the above example methods, wherein the communication condition is a line of sight between the first wireless communication device and the second wireless communication device.

One or more of the above example methods, wherein determining that the first predicted motion will trigger the communication condition comprises determining that the first vehicle will travel past the relay node to be closer to the second wireless communication device than the relay node is to the second wireless communication device.

One or more of the above example methods, wherein the relay node at a fixed location.

One or more of the above example methods, wherein the relay node is associated with a third vehicle.

One or more of the above example methods, further comprising transmitting predicted position information for the first vehicle at a time of the reserved radio resources to the second wireless communication device and transmitting predicted position information of the second wireless communication device to the first wireless communication device.

One or more of the above example methods, wherein the radio resources include frequency domain resources having a frequency greater than 28 GHz.

An example device (e.g., a relay node) comprising a transceiver, a memory configured to store instructions, and one or more processors communicatively coupled with the transceiver and the memory, wherein the one or more processors are configured to perform all or part of one or more of the above example methods.

An example apparatus for use in a device (e.g., a relay node) comprising means for wireless communication, means for storing instructions and data, and means for performing all or part of one or more of the above example methods.

A second example method of wireless communications for a wireless device, comprising: transmitting, to a relay node, a first predicted motion of a first vehicle including a first wireless communication device having a first established communication channel with the relay node; receiving an indication that the first predicted motion will trigger a communication condition for the first vehicle and a second wireless communication device having a second established communication channel with the relay node, the indication including reserved resources for a third communication channel between the first wireless communication device and the second wireless communication device; communicating between the first wireless communication device and the second wireless communication device using the reserved resources for a third communication channel without performing a random access procedure between the first wireless communication device and the second wireless communication device.

The second example method as above, wherein the reserved resources include a transmission opportunity (TXOP), and wherein the communication condition is predicted to occur at the time of the TXOP.

One or more of the second example methods as above, wherein the indication includes a second predicted motion of the second wireless communication device, the method further comprising determining beamforming parameters for the third communication channel based on the first predicted motion and the second predicted motion.

One or more of the second example methods as above, wherein the relay node at a fixed location.

One or more of the second example methods as above, wherein the relay node is associated with a third vehicle.

Another example device (e.g., a UE) comprising a transceiver, a memory configured to store instructions, and one or more processors communicatively coupled with the transceiver and the memory, wherein the one or more processors are configured to perform all or part of one or more of the above second example methods.

Another example apparatus for use in a device (e.g., a UE) comprising means for wireless communication, means for storing instructions and data, and means for performing all or part of one or more of the above second example methods.

What is claimed is:

1. A method of wireless communications, comprising:
   transmitting, to a relay node, a first predicted motion of a first vehicle including a first wireless communication device having a first established communication channel with the relay node;
   receiving an indication that the first predicted motion will trigger a communication condition for the first vehicle and a second wireless communication device having a second established communication channel with the relay node, the indication including reserved resources for a third communication channel between the first wireless communication device and the second wireless communication device; and
   communicating between the first wireless communication device and the second wireless communication device using the reserved resources for the third communication channel without performing a random access procedure between the first wireless communication device and the second wireless communication device.

2. The method of claim 1, wherein the reserved resources include a transmission opportunity (TXOP), and wherein the communication condition is predicted to occur at a time of the TXOP.

3. The method of claim 1, wherein the indication includes a second predicted motion of the second wireless communication device, the method further comprising determining beamforming parameters for the third communication channel based on the first predicted motion and the second predicted motion.

4. The method of claim 1, wherein the relay node at a fixed location.

5. The method of claim 1, wherein the relay node is associated with a third vehicle.

6. The method of claim 1, wherein the communication condition is a line of sight between the first wireless communication device and the second wireless communication device.

7. The method of claim 1, wherein the first predicted motion indicates that the first vehicle will travel past the relay node to be closer to the second wireless communication device than the relay node is to the second wireless communication device.

8. The method of claim 1, further comprising receiving predicted position information of the second wireless communication device at a time of the reserved resources.

9. The method of claim 1, wherein the reserved resources include frequency domain resources having a frequency greater than 28 GHz.

10. A first wireless communication device for wireless communications, comprising:
    a memory storing processor-executable instructions; and
    at least one processor in communication with the memory, wherein the at least one processor is configured to execute the instructions to:
    transmit, to a relay node, a first predicted motion of a first vehicle including the first wireless communication device having a first established communication channel with the relay node;
    receive an indication that the first predicted motion will trigger a communication condition for the first vehicle and a second wireless communication device having a second established communication channel with the relay node, the indication including reserved resources for a third communication channel between the first wireless communication device and the second wireless communication device; and
    communicate between the first wireless communication device and the second wireless communication device using the reserved resources for the third communication channel without performing a random access procedure between the first wireless communication device and the second wireless communication device.

11. The first wireless communication device of claim 10, wherein the reserved resources include a transmission opportunity (TXOP), and wherein the communication condition is predicted to occur at a time of the TXOP.

12. The first wireless communication device of claim 10, wherein the indication includes a second predicted motion of the second wireless communication device, wherein the at least one processor is configured to determine beamforming parameters for the third communication channel based on the first predicted motion and the second predicted motion.

13. The first wireless communication device of claim 10, wherein the relay node at a fixed location.

14. The first wireless communication device of claim 10, wherein the relay node is associated with a third vehicle.

15. The first wireless communication device of claim 10, wherein the communication condition is a line of sight between the first wireless communication device and the second wireless communication device.

16. The first wireless communication device of claim 10, wherein the first predicted motion indicates that the first vehicle will travel past the relay node to be closer to the second wireless communication device than the relay node is to the second wireless communication device.

17. The first wireless communication device of claim 10, wherein the at least one processor is further configured to receive predicted position information of the second wireless communication device at a time of the reserved resources.

18. The first wireless communication device of claim 10, wherein the reserved resources include frequency domain resources having a frequency greater than 28 GHz.

19. A first wireless communication device for wireless communications, comprising:
means for transmitting, to a relay node, a first predicted motion of a first vehicle including the first wireless communication device having a first established communication channel with the relay node;
means for receiving an indication that the first predicted motion will trigger a communication condition for the first vehicle and a second wireless communication device having a second established communication channel with the relay node, the indication including reserved resources for a third communication channel between the first wireless communication device and the second wireless communication device; and
means for communicating between the first wireless communication device and the second wireless communication device using the reserved resources for the third communication channel without performing a random access procedure between the first wireless communication device and the second wireless communication device.

20. The first wireless communication device of claim 19, wherein the reserved resources include a transmission opportunity (TXOP), and wherein the communication condition is predicted to occur at a time of the TXOP.

21. The first wireless communication device of claim 19, wherein the indication includes a second predicted motion of the second wireless communication device, the first wireless communication device further comprising means for determining beamforming parameters for the third communication channel based on the first predicted motion and the second predicted motion.

22. The first wireless communication device of claim 19, wherein the relay node at a fixed location.

23. The first wireless communication device of claim 19, wherein the relay node is associated with a third vehicle.

24. The first wireless communication device of claim 19, wherein the communication condition is a line of sight between the first wireless communication device and the second wireless communication device.

25. The first wireless communication device of claim 19, wherein the first predicted motion indicates that the first vehicle will travel past the relay node to be closer to the second wireless communication device than the relay node is to the second wireless communication device.

26. The first wireless communication device of claim 19, wherein the means for receiving is configured to receive predicted position information of the second wireless communication device at a time of the reserved resources.

27. The first wireless communication device of claim 19, wherein the reserved resources include frequency domain resources having a frequency greater than 28 GHz.

28. A non-transitory computer-readable medium storing computer code executable by a processor for wireless communications, comprising code to:
transmit, to a relay node, a first predicted motion of a first vehicle including a first wireless communication device having a first established communication channel with the relay node;
receive an indication that the first predicted motion will trigger a communication condition for the first vehicle and a second wireless communication device having a second established communication channel with the relay node, the indication including reserved resources for a third communication channel between the first wireless communication device and the second wireless communication device; and
communicate between the first wireless communication device and the second wireless communication device using the reserved resources for the third communication channel without performing a random access procedure between the first wireless communication device and the second wireless communication device.

29. The non-transitory computer-readable medium of claim 28, wherein the reserved resources include a transmission opportunity (TXOP), and wherein the communication condition is predicted to occur at a time of the TXOP.

30. The non-transitory computer-readable medium of claim 28, wherein the indication includes a second predicted motion of the second wireless communication device, the non-transitory computer-readable medium further comprising code to determine beamforming parameters for the third communication channel based on the first predicted motion and the second predicted motion.

* * * * *